UNITED STATES PATENT OFFICE.

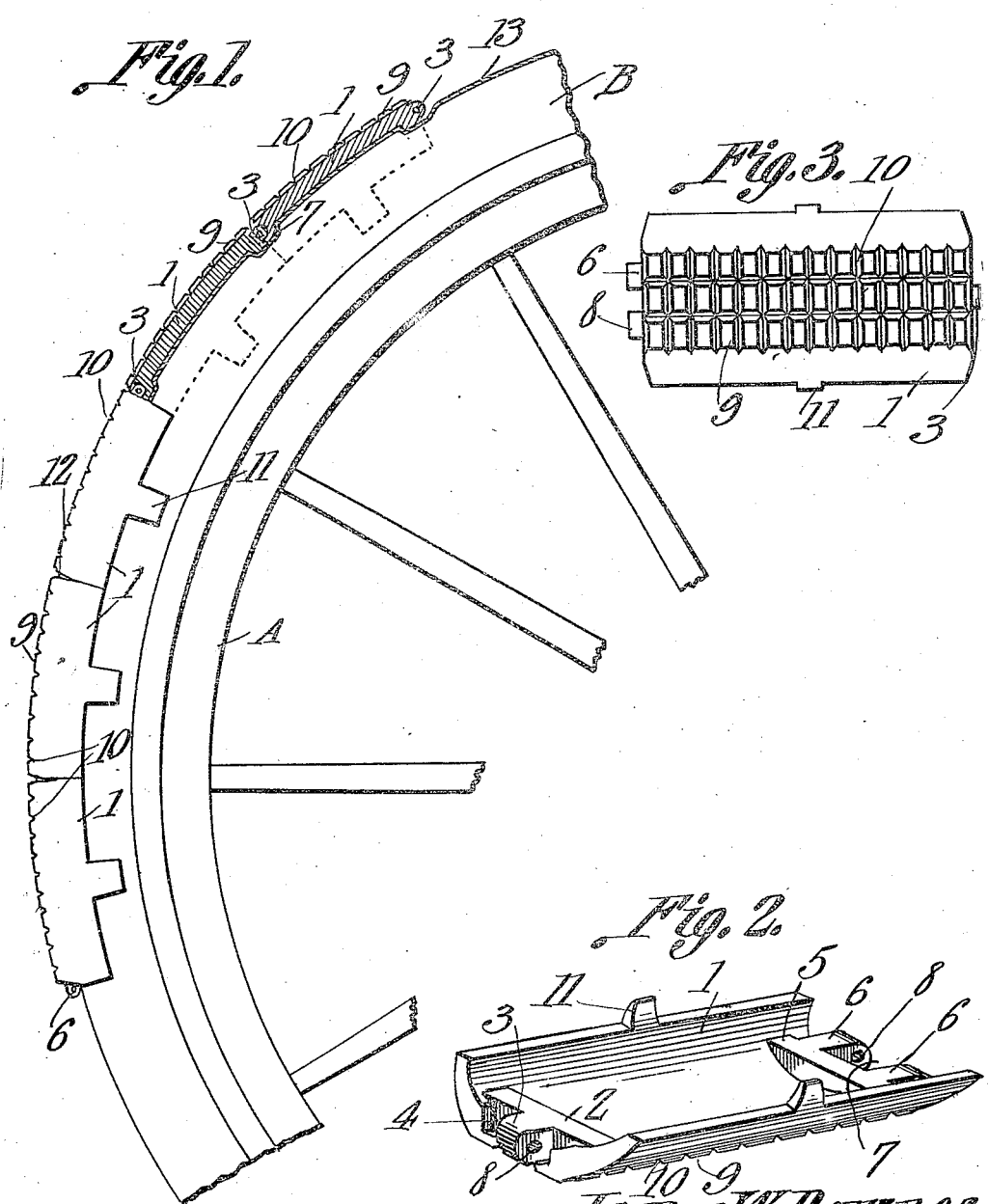

JAMES W. DOWNES, OF SPOKANE, WASHINGTON.

TIRE-SHIELD.

999,760.  Specification of Letters Patent.  Patented Aug. 8, 1911.

Application filed May 13, 1910. Serial No. 561,214.

*To all whom it may concern:*

Be it known that I, JAMES W. DOWNES, a citizen of the United States, residing at Spokane, in the county of Spokane and State of Washington, have invented a new and useful Tire-Shield, of which the following is a specification.

This invention relates to tire shields and its object is to provide a device of this character made up of hingedly connected metallic sections so constructed as to yield and push inwardly upon the tire when passing over an unyielding projection or obstruction, thus interfering in no wise with the resiliency of the tire.

A further object is to provide a sectional shield of this character which is held upon the tire by inflating said tire so as to cause it to bind firmly upon the inner surface of the shield.

A further object is to provide a shield of this character which not only serves to protect the tire but also constitutes means for preventing skidding.

With these and other objects in view the invention consists of certain novel details of construction and combinations of parts hereinafter more fully described and pointed out in the claim.

In the accompanying drawings the preferred form of the invention has been shown.

In said drawings:—Figure 1 is a view partly in side elevation and partly in section of a portion of a wheel having the present improvements applied thereto. Fig. 2 is an inverted perspective view of a portion of the shield. Fig. 3 is a plan view of one of the shield sections.

Referring to the figures by characters of reference A designates a wheel of the ordinary construction and having a pneumatic tire B thereon. The shield adapted to be used on the tire is made up of a plurality of arcuate sections 1 formed of metal and each of which is bowed transversely so as to conform to the transverse contour of the tire. Each section has a cross rib 2 formed within one end portion thereof and from which extends an ear 3, this ear projecting a short distance beyond the end of the section. Recesses 4 are formed within said end of the section and at opposite sides of the ear 3. Another transverse rib 5 is formed within each section 1 adjacent its other end and has spaced ears 6 extending therefrom and projecting a short distance beyond the end of the section, there being a recess 7 within said end and between the ears and also between the sides of the section and the ears as indicated in Fig. 3. The distance between the ears 6 is slightly greater than the width of the ears 3. All of these ears are provided with pivot-pin receiving openings 8 adapted to register when the ear 3 is placed between the ears 6 of an adjoining section.

The tread portion 9 of each section is preferably provided with a series of longitudinal and transverse grooves 10 forming a roughened surface adapted to engage the ground and prevent the wheel from skidding. Each of the sections 1 has guard fingers 11 extending from the sides thereof and toward the rim of the wheel A. The meeting portions of the sections are preferably beveled as shown at 12 so as to permit the said sections to swing inwardly upon their pivot when the tire B yields under the weight of a load.

In using the shield herein described, a strip of asbestos paper, such as has been shown at 13, is preferably placed around the tread portion of the tire B while said tire is collapsed. The shield, which is the form of an endless series of the sections 1, is then placed upon the collapsed tire so as to cover the asbestos paper 13. The tire is then inflated so as to press outwardly against the shield and draw the sections 1 taut. It will be seen that when the shield is thus applied the ears constituting the hinges will be practically entirely concealed and will not be subjected to any wear from the surface over which the wheel travels. Should the wheel pass over a projection, the sections 1 adjacent thereto will press the tire toward the rim of the wheel A and the elasticity of said tire will not, therefore, be impaired to any extent. The guard fingers 11 serve to lap the tire to such an extent as to positively eliminate all danger of the shield slipping laterally off of the tire. The asbestos interposed between the tire and the shield serves to prevent injury to the tire as a result of heat generated by friction. It also serves as a lining for the shield and prevents any injury which might result from the abrasive action of the shield upon the tire.

Various changes can of course be made in the construction and arrangements of the parts without departing from the spirit or sacrificing any of the advantages of the invention as defined in the appended claim.

What is claimed is:—

A tire shield consisting of a plurality of similar metallic sections connected together to form an endless shield, each of said sections consisting of a transversely bowed arcuate member having an integral cross rib within one end portion thereof, an ear integral with and extending from the rib and projecting a short distance beyond the end of the member, there being recesses within said end of the member at opposite sides of the ear, another transverse rib within the other end portion of the member and having spaced ears extending therefrom and projecting a short distance beyond the end of the member, there being recesses within said end portion between the ears and also between the ears and the side portions of the member, there being pivot pin receiving openings in all of the ears, said member being imperforate, the ends of the member being beveled and there being integral guard fingers extending from the sides of the member.

In testimony that I claim the foregoing as my own, I have hereto affixed my signature in the presence of two witnesses.

JAMES W. DOWNES.

Witnesses:
S. A. PARREUSEU,
F. J. McCORMACK.

Copies of this patent may be obtained for five cents each, by addressing the "Commissioner of Patents, Washington, D. C."